(12) United States Patent
Millington et al.

(10) Patent No.: US 6,529,822 B1
(45) Date of Patent: Mar. 4, 2003

(54) NAVIGATION SYSTEM WITH ZOOMED MANEUVER INSTRUCTION

(75) Inventors: Jeffrey Alan Millington, Rochester Hills, MI (US); Anthony A. Slominski, Harrison Township, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/547,004

(22) Filed: Apr. 11, 2000

(51) Int. Cl.[7] .......................... G01S 13/00; G06K 9/00; G08G 1/123; G09G 5/26
(52) U.S. Cl. .................. 701/206; 382/113; 340/988; 345/671
(58) Field of Search .................. 701/200–211, 213–216, 701/23, 25, 26; 382/104, 113; 340/995, 988–990; 345/619, 620, 682, 684, 472, 671, 801

(56) References Cited

U.S. PATENT DOCUMENTS 5,848,364 A * 12/1998 Ohashi ........................ 701/26
6,081,609 A * 6/2000 Narioka ...................... 382/113
6,092,076 A * 7/2000 McDonough et al. ........ 707/102
6,151,552 A * 11/2000 Koizumi et al. ............. 340/988

\* cited by examiner

Primary Examiner—Thu Nguyen
(74) Attorney, Agent, or Firm—Carlson, Gaskey & Olds

(57) ABSTRACT

A vehicle navigation system provides a zoomed maneuver instruction view which displays a magnified view of the upcoming maneuver. Display of the zoomed maneuver instruction view is preferably related to the complexity of the road segments adjacent the upcoming maneuver. In one embodiment, the zoomed maneuver instruction view is displayed if more than N numbers of shape points are within a predetermined distance along the recommended route. In another embodiment, the zoomed maneuver instruction view is displayed if the recommended route includes an upcoming complex maneuver adjacent a road segment with more than N number of shape points. Preferably, the CPU will continue to magnify the complex maneuver in the zoomed maneuver instruction view as the vehicle and associated vehicle icon progresses through the complex maneuver.

40 Claims, 4 Drawing Sheets

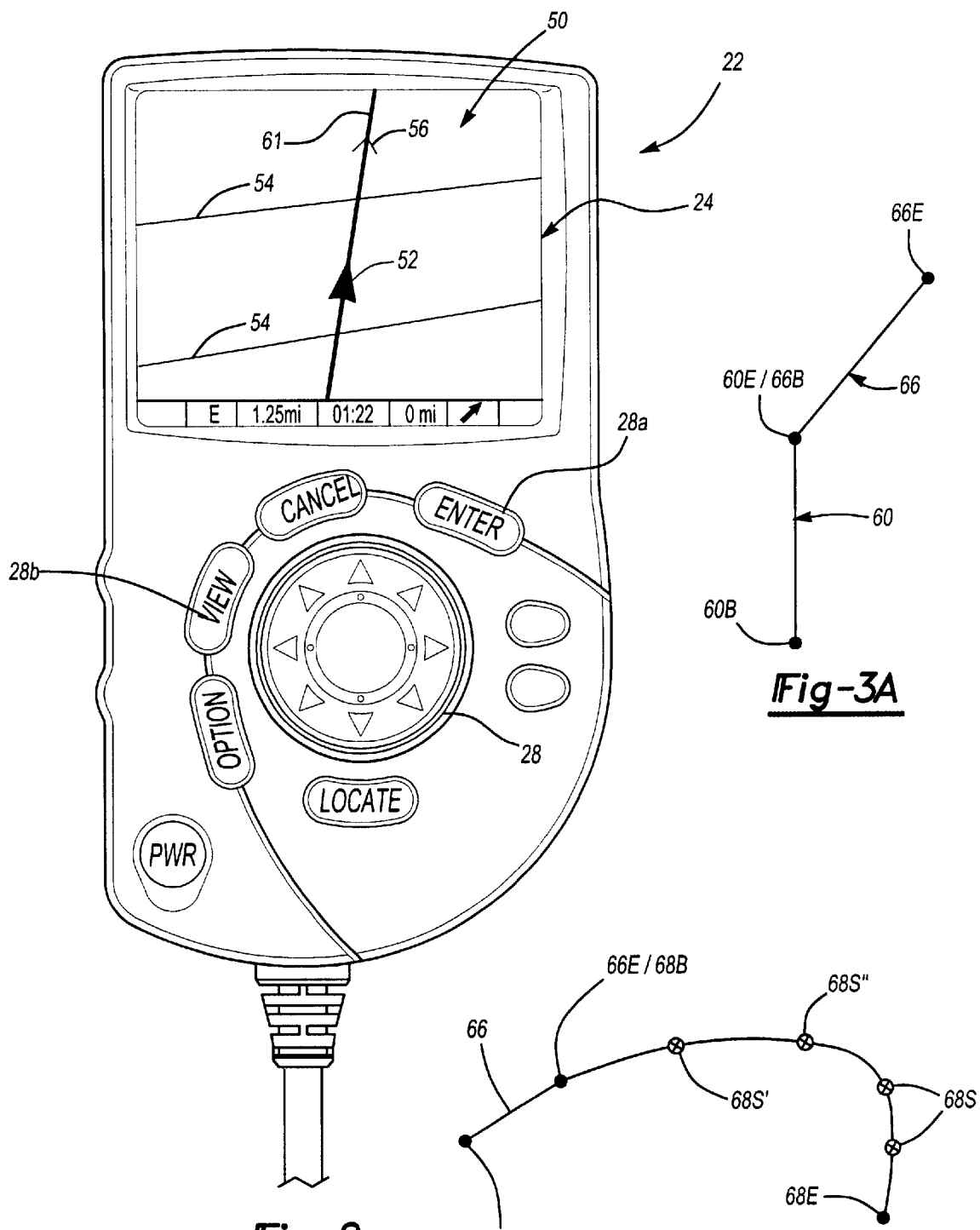

NAVIGATION SYSTEM WITH ZOOMED MANEUVER INSTRUCTION

BACKGROUND OF THE INVENTION

This invention generally relates to navigation or route guidance systems and, more particularly, to a system having a zoomed maneuver instruction view which provides a magnified view of a complex maneuver to provide clear and detailed instructions through the complex maneuver.

Navigation systems generally provide a recommended route to a desired destination. Generally, the desired destination is selected from a large database of roads stored in a mass media storage, such as a CD ROM, which includes the roads in the area to be traveled by the user. If the navigation system is installed in a vehicle, the starting point is typically associated with the vehicle position and can be input to the navigation system by an associated position determining system that usually includes a GPS (Global Positioning System) receiver.

The navigation system determines a route to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the vehicle, the desired destination and highlighting the recommended route. Preferably, if the navigation system is installed in a vehicle, the navigation system displays the current position of the vehicle and provides visual turn-by-turn instructions to the driver, guiding the driver to the selected destination.

The turn-by-turn instruction is typically selected from a database of predefined maneuver instructions such as a generic left-turn instruction, a right-turn instruction straight-ahead instruction or the like. However, the particular upcoming maneuver may not be provided in the maneuver instruction database. This may be confusing to the driver as the driver may have trouble identifying the generic instructed maneuver with the surroundings. This is particularly troubling in a highly congested and road intense environment such as a city.

It is thus desirable to provide a system for projecting definite maneuver instructions that accurately depict the vehicle surroundings and enhance the ability of a driver to correctly perceive the maneuver instruction.

SUMMARY OF THE INVENTION

In general terms, this invention provides a zoomed maneuver instruction view which provides a magnified view of a map display view.

The navigation system generally includes a database of a plurality of roads, a position determining system, an input device, and a route determination system. The position determining system determines a position of the vehicle relative to the plurality of roads. The user selects a destination from the database with the input device. The navigation system then calculates and displays a recommended route directing the driver of the vehicle to the desired destination. As the vehicle approaches an upcoming maneuver the display magnifies the large-scale map display view to provide a zoomed maneuver instruction view.

During many simple maneuvers, such as an individual left or right turn, a single maneuver instruction representation is displayed in a known manner. The maneuver instruction illustrates the upcoming maneuver to be performed along the recommended route to the destination. However, in some instances a user may be required to perform a complex or unusual maneuver to continue along a recommended route. Such complex maneuvers are typical in metro areas and may lead a user to incorrectly perform the maneuver. When such a maneuver is required the present invention switches to a zoomed maneuver instruction view which displays a magnified view of the complex maneuver.

Display of the zoomed maneuver instruction view is preferably related to the complexity of the road segments adjacent the upcoming maneuver. Each road segment and node are commonly stored within the database in a compressed or short-hand format to save space. Typically, the beginning and ending latitude and longitude (hereafter lat/long) point is the node which connects one segment to another road segment. The node being the ending lat/long point for the first road segment and also the beginning lat/long point for a second road segment. The database is therefore composed of a simple list of segments and associated beginning and ending lat/long points. This is effective for straight road segments. To store a non-straight road segment, a shape point is added between the beginning and ending lat/long points. Each shape point is preferably related back to the previous shape point. A first shape point is stored within the database as a lat/long point relative to the beginning lat/long point.

In one disclosed embodiment, the compressed road segment storage within the database allows the CPU to determine the complexity of any road segment. When the CPU identifies a complex road segment along the recommended route, the display switches to the zoomed maneuver instruction view.

In one embodiment, the zoomed maneuver instruction view is displayed if more than N numbers of shape points are within a predetermined distance along the recommended route. In another embodiment, the zoomed maneuver instruction view is displayed if the recommended route includes an upcoming complex maneuver adjacent a road segment with more than N number of shape points.

The zoomed maneuver instruction view is a magnified view of the map display view. Preferably, the CPU will continue to magnify the complex maneuver in the zoomed maneuver instruction view as the vehicle and associated vehicle icon progresses through the complex maneuver. When the complex maneuver completely fills a border within the display, the CPU will no longer zoom in on the complex maneuver in the zoomed maneuver instruction view. The zoomed maneuver instruction view will be maintained at this magnification as the vehicle icon progresses through the complex maneuver. The user can therefore better identify the relative position of the vehicle as vehicle icon progresses toward the next upcoming maneuver of the complex maneuver.

The user is thereby provided with clear instruction through the complex maneuver and is less likely to incorrectly perform the maneuver. This is particularly advantageous in a highly congested or road intense environment such as a city.

BRIEF DESCRIPTION OF THE DRAWINGS

These and other features and advantages of this invention will become more apparent to those skilled in the art from the following detailed description of the presently preferred embodiment. The drawings that accompany the detailed description can be described as follows.

FIG. 2 is the OIM of the navigation system illustrated in FIG. 1 showing a map display;

FIG. 3A illustrates a methodology for compressed storage of a straight road segment;

FIG. 3B illustrates a methodology for compressed storage of a non-straight road segment;

DETAILED DESCRIPTION OF THE PREFERRED EMBODIMENT

Figure 1:
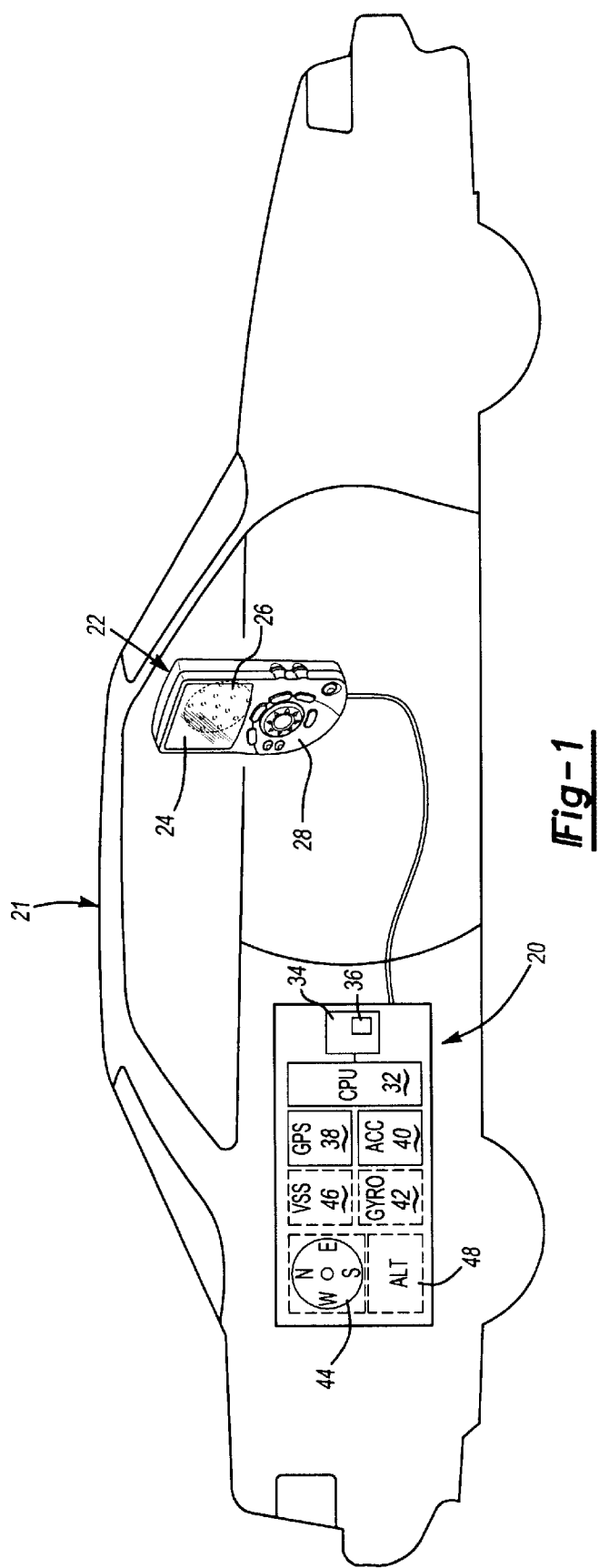
FIG. 1 is a schematic of a navigation system according to the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route on the display 24 directing the driver of the vehicle 21 to the desired destination. Preferably, the navigation system 20 displays turn-by-turn instructions on display 24 and gives corresponding audible instructions on audio speaker 26, guiding the driver to the desired destination.

FIG. 2 illustrates the OIM 22. As can be seen in FIG. 2, the input devices 28 include an "enter" key 28a. The display 24 is in a map display mode displaying a map view 50, including a vehicle icon 52 representing the current position of the vehicle 21 on roads 54. The navigation system 20 is in a route guidance mode and displays a recommended route 61. The navigation system 20 displays the current position by displaying the vehicle icon 52 relative to the roads 54, on display 24. The map display view 50 of FIG. 2 is normally displayed with the heading of the vehicle icon 52 directed upwards with the map of roads 54 moving and rotating based upon movement of the vehicle 21. However, the map display view 50 can also display a movable vehicle icon 52 relative to a constant heading (such as North up), based upon user preference.

The map display view 50 is a 2-dimensional top down view. The recommended route 61 is preferably highlighted or bolded to stand out against the map of roads 54. Other route indicators such as arrows 56 can also be displayed along the recommended route 61. The map of roads are selected from the database 36 described above and displays the position of the vehicle 21 relative to the map database 36, i.e. relative positions on road segments and intersections ("nodes"). Each road segment and node are commonly stored within the database 36 in a compressed or short-hand format to save space.

FIG. 3A schematically illustrates a compressed format. In one compressed format, a segment 60 is stored by a beginning latitude and longitude (lat/long) point 60B and an ending lat/long point 60E. Typically, the beginning and ending lat/long point is the node which connects one segment to another road segment. The node being the ending lat/long point 60E for the first road segment 60 and also the beginning lat/long point 66B for a second road segment 66. The database 36 is therefore composed of a simple list of segments and associated beginning and ending lat/long points. This is effective for straight road segments.

To store a non-straight road segment 68 as schematically illustrated in FIG. 3B, a shape point 68S is also added between the beginning 68B and ending lat/long points 68E. Each shape points 68S preferably related back to the previous shape point. The first shape point 68S' is stored within the database 36 as a lat/long point relative to the beginning lat/long point 68B. Because the first lat/long of the shape point 68S' is in close proximity to the lat/long of the beginning lat/long point 68B, only the difference in lat/long is stored in the database 36. This again saves storage space within the database. Further shape points are stored in relation to the previous shape point. For example, a second shape point 68S" is stored relative to the first shape point 68S'. For non-straight road segments, the database 36 is a list of segments, associated beginning and ending lat/long points, and relatively stored shape points located therebetween.

The compressed road segment storage within the database 36 thereby allows the CPU 32 to determine the complexity of any road segment. The more shape points within any particular road segment the more complex the road segment. It will be realized that other database storage methods can also take advantage of the present invention. It should also be understood that the shape points S are displayed for illustrative purposes only and would not be presented to a user of OIM 22.

Figure 5:
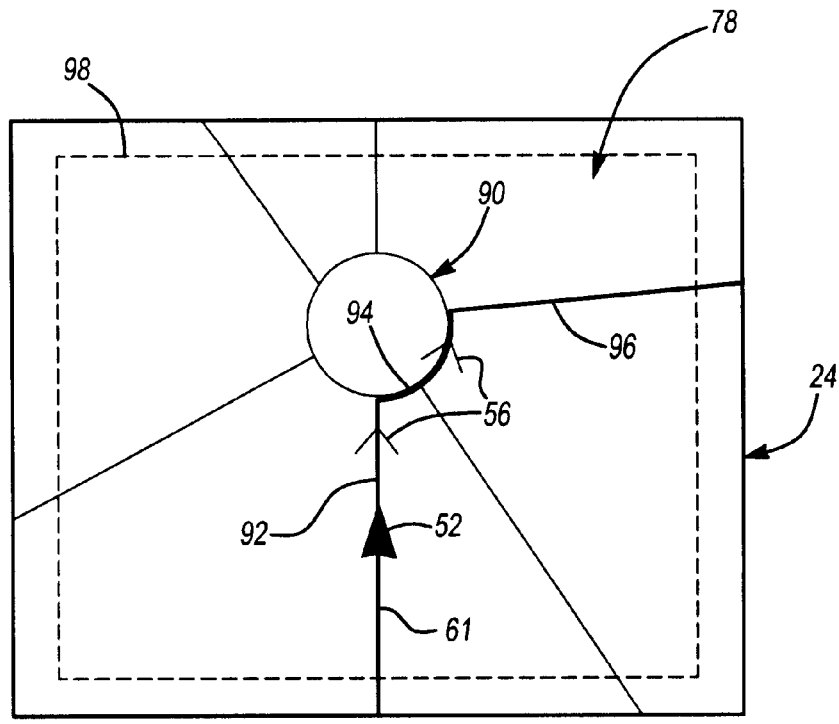
FIG. 5 is a zoomed maneuver instruction view as the vehicle approaches closer to the complex maneuver.

During many simple maneuvers, such as an individual left or right turn, a single maneuver instruction representation is displayed in a known manner. The maneuver instruction illustrates the upcoming maneuver to be performed along the recommended route to the destination. However, in some instances a user may be required to perform a complex or other unusual maneuvers to continue along the recommended route 61 (FIG. 2). Such maneuvers are typical in metro areas and may lead a user to incorrectly perform the maneuver. When such a maneuver is required the display 24 switches to a zoomed maneuver instruction view 78 (FIG. 5).

Display of the zoomed maneuver instruction view 78 is preferably related to the complexity of the upcoming maneuvers. In one embodiment, the zoomed maneuver instruction view 78 is displayed if more than N numbers of shape points are within a predetermined distance along the recommended route 61. In another embodiment, the zoomed maneuver instruction view 78 is displayed if the recommended route 61 includes an upcoming complex maneuver adjacent a road segment with more than N number of shape points.

By way of illustration, the method of the present invention and the use of the zoomed maneuver instruction view 78 will be described as it would be used to instruct a driver to make a complex maneuver such as a traffic circle turn. As will be understood by one of ordinary skill in the art, the method and system would be utilized to provide other route guidance instructions for other complex maneuvers.

Figures 4A, 4B:
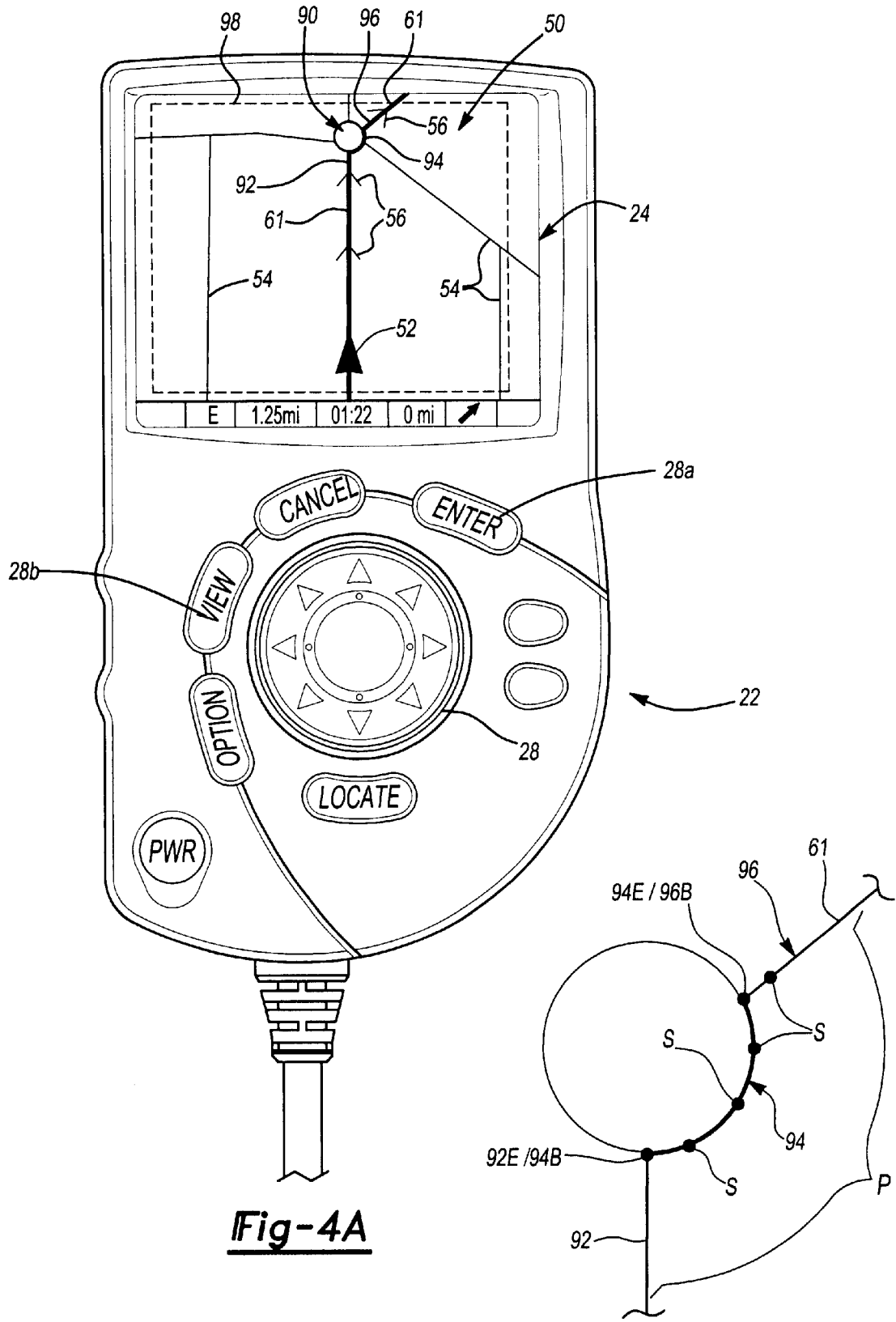
FIG. 4A is the OIM of the navigation system illustrated in FIG. 1 showing a map display view with the vehicle approaching a complex maneuver.
FIG. 4B is an expanded view of the complex maneuver area illustrated on the map display view of FIG. 4A.

Referring to FIG. 4A, the display 24 is in a map display mode displaying a map view 50, including a vehicle icon 52 representing the current position of the vehicle 21 on roads 54. The vehicle is travelling along the recommended route 61 and approaching a complex maneuver 90, which in this disclosed embodiment is a traffic circle 90. The traffic circle 90 includes a first road segment 92, a circle road segment 94 and an exit road segment 96.

As described above, each of the segments 92,94,96 include a beginning point B, an end point E, and a plurality of shape points S as illustrated in the expanded view of FIG. 4B. As the vehicle approaches the traffic circle 90 the CPU 32 identifies that more than an N number of shape points S are present within a predetermined distance P along recommended route 61. In this example three (3) shape points S are located in the circle road segment 94 and one (1) shape point is included within the exit road segment 96.

In the disclosed embodiment, N will be set equal to three (3). More than three (3) shape points within the predetermined distance P will cause the CPU 32 to switch the display 24 to the zoomed maneuver instruction view 78. Notably, the predetermined distance P can encompass more than a single road segment. In this embodiment, the predetermined distance P encompasses a portion of the first road segment 92, the circle road segment 94 and a portion of the exit road segment 96. However, the zoomed maneuver instruction view 78 (FIG. 5) can also be displayed when an upcoming complex maneuver has but a single road segment with more than N number of shape points.

Upon identification of more than an N number of shape points S, the CPU 32, will switch the display 24 to the zoomed maneuver instruction view 78 (FIG. 5) when the vehicle 21 approaches within the vicinity of the complex maneuver 90. Preferably, the CPU switches to the zoomed maneuver instruction view 78 when both the complex maneuver 90 and the vehicle icon 52 are both visible on the display 24 when in map view 50.

In another embodiment, the CPU 32 switches to the zoomed maneuver instruction view 78 when both the complex maneuver 90 and the vehicle icon 52 are within a border 98 (FIG. 4A) set within the display 24. By providing the border 98 within the display 24 a user is more likely to identify the relative position of the vehicle icon 52 relative to the complex maneuver 90. Further, the area outside of the border 98 can provide additional information to the user without the possibility of the information obscuring the complex maneuver 90.

When both the complex maneuver 90 and the vehicle icon 52 come within the border 98, the CPU 22 switches from the map display view 50 (FIG. 4A) to the zoomed maneuver instruction view 78 (FIG. 5). In one disclosed embodiment, the border 98 is a line of pixels located a predetermined number of pixels from the edges of the display 24. The CPU 32 (FIG. 1) will thereby identify movement of the vehicle icon 52 and complex maneuver 90 through the border 98. Further, the magnification or "zoom" of the zoomed maneuver instruction view 78 (FIG. 5) can be adjusted by the CPU 32 with reference to the border 98. In other words, the CPU 32 magnifies the zoomed maneuver instruction view 78 until the vehicle icon 52 and complex maneuver 90 contact the border 98. Accordingly, the CPU 32 maintains an optimal magnification without cropping the vehicle icon 52 or complex maneuver 90.

As illustrated in FIG. 5, the zoomed maneuver instruction view 78 is a magnified view of the map display view 50. The first road segment 92, the circle road segment 94 and the exit road segment 96 filling a larger portion of the display 24. Vehicle icon 52 is located along the first road segment 92 and along the recommended path 61 just prior to the circle road segment 94. Preferably, the CPU will continue to magnify the complex maneuver in the zoomed maneuver instruction view 78 as the vehicle 21 and associated vehicle icon 52 progresses through the complex maneuver 90.

Figure 6:
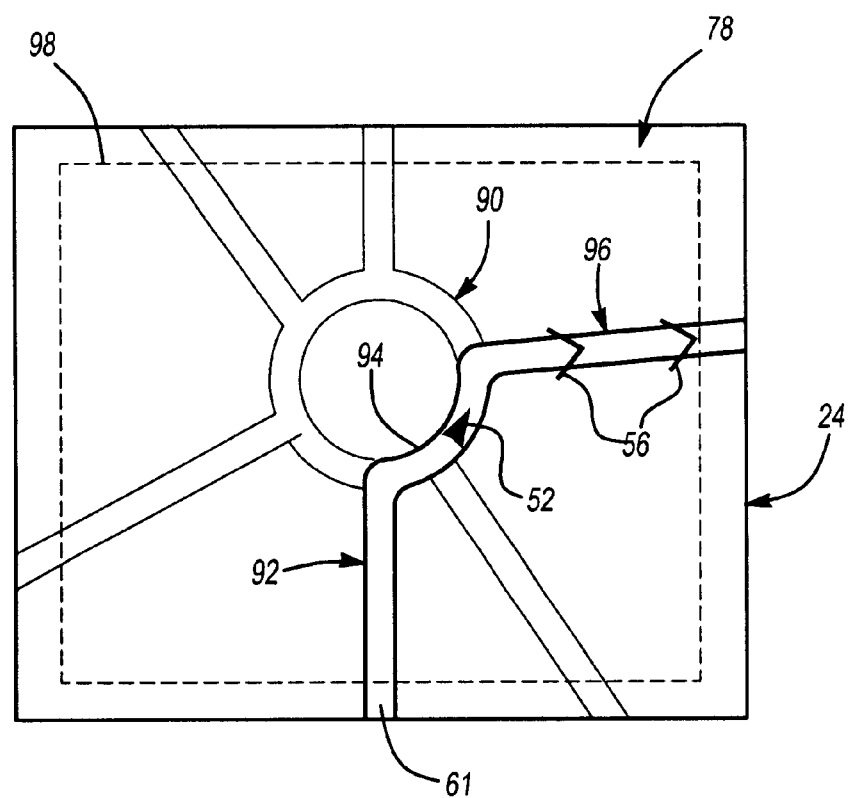
FIG. 6 is a further magnified zoomed maneuver instruction view as the vehicle travels along the complex maneuver illustrated in FIG. 5.

Referring to FIG. 6, the vehicle 21 has further progressed through the complex maneuver 90 and the associated vehicle icon 52 is now located on the circle road segment 94. Preferably, when the complex maneuver 90 completely fills the border 98, the CPU 32 will no longer zoom in on the complex maneuver 90 in the zoomed maneuver instruction view 78. The zoomed maneuver instruction view 78 will therefore be maintained at this magnification as the vehicle icon 52 progresses through the complex maneuver. The user can therefore better identify the relative position of the vehicle 21 as vehicle icon 52 progresses toward the next upcoming maneuver (exit road segment 96) of the complex maneuver 90.

As further illustrated, route indicator arrows 56 are displayed along the recommended route 61 in the zoomed maneuver instruction view 78. Preferably, the route indicator arrows 56 are only displayed forward of the vehicle icon 52 along the recommended route 61 to further orient a user within the complex maneuver 90.

Once the last upcoming maneuver (exit road segment 96) of the complex. maneuver 90 is completed, the display 24 returns to the map display view 50 (FIG. 4A).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

We claim:

1. A vehicle navigation system comprising:
   a database including a plurality of roads;
   a route determination system, said system determining a route to a destination via a plurality of maneuvers on said plurality of roads, said plurality of maneuvers including a first maneuver adjacent a first road segment;
   a CPU for determining a complexity of said first road segment based upon a comparison of a number of shape points in the first road segment to a threshold; and
   a display for displaying a zoomed maneuver instruction view of said first maneuver based upon said first maneuver being an immediately upcoming maneuver and the number of shape points exceeding the threshold.

2. The vehicle navigation system of claim 1 further including,
   a system for determining the position of the vehicle relative to said database of roads; and
   a user input device for selecting a desired destination for the vehicle relative to said database of roads.

3. A vehicle navigation system as recited in claim 1, wherein a beginning point and an end point of said road segment are stored within said database.

4. A vehicle navigation system as recited in claim 3, wherein said beginning point and said end point of said road segment are stored as latitudes and longitudes.

5. A vehicle navigation system as recited in claim 3, wherein at least one of the shape points located between said beginning point and said end point of said road segment is stored within said database.

6. A vehicle navigation system as recited in claim 5 wherein said shape point of said road segment is stored as a latitude and a longitude.

7. A vehicle navigation system as recited in claim 5 wherein said shape point is stored as a latitude and a longitude relative to a previous point of said road segment.

8. A vehicle navigation system as recited in claim 5 wherein said CPU identifies a number of said shape points within a predetermined distance from a current position of a vehicle to the first maneuver to determine said complexity of said road segment.

9. A vehicle navigation system as recited in claim 1, wherein said display displays a map display view until the vehicle is within a predetermined distance of said first maneuver.

10. A vehicle navigation system as recited in claim 9, wherein said zoomed maneuver instruction view is a magnified view of said map display view.

11. A vehicle navigation system as recited in claim 10, wherein said CPU continually adjusts said zoomed maneuver instruction view on said display closer to said first maneuver in response to a position of the vehicle relative to said first maneuver.

12. A vehicle navigation system as recited in claim 1, wherein said CPU adjusts said zoomed maneuver instruction view on said display to display said first maneuver and said vehicle icon.

13. A vehicle navigation system as recited in claim 12, wherein said CPU adjusts said display to display said first maneuver and said vehicle icon within a border defined within said display.

14. A vehicle navigation system as recited in claim 13, wherein said CPU stops adjustment of said zoomed maneuver instruction view on said display when said first maneuver fills said display.

15. A vehicle navigation system as recited in claim 13, wherein said CPU stops adjustment of said zoomed maneuver instruction view on said display when said first maneuver fills a border defined within said display.

16. A vehicle navigation system as recited in claim 13, wherein said CPU moves said vehicle icon along said first maneuver in response to a position of the vehicle relative to said first maneuver.

17. The vehicle navigation system of claim 1 further including,
   displaying a vehicle icon relative to said database of roads while displaying said zoomed maneuver instruction view of said first maneuver.

18. A vehicle navigation system comprising:
   a database including a plurality of roads, each of said plurality of roads including a road segment stored within said database as a beginning point, an end point, and at least one shape point therebetween;
   a user input device for selecting a desired destination for a vehicle relative to said database of roads;
   a route determination system, said system determining a route to said destination via a plurality of maneuvers on said plurality of roads, said plurality of maneuvers including a first maneuver between a first road segment and a second road segment;
   a position determining system, said position determining system determining a position of the vehicle relative to said plurality of roads and said first maneuver;
   a CPU for identifying a quantity of said shape points to determine a complexity of said first and said second road segment based upon a comparison of the quantity of shape points to a threshold; and
   a display for displaying a map display view until the vehicle is within a predetermined distance of said first maneuver, said display selectively displaying a zoomed maneuver instruction view of said first maneuver is if the quantity of shape points exceeds the threshold, and if said first maneuver is an immediately upcoming maneuver.

19. A vehicle navigation system as recited in claim 18 wherein said beginning point, said end point and said shape point of said road segments are each stored as a latitude and a longitude.

20. A vehicle navigation system as recited in claim 19 wherein said shape point is stored as a latitude and a longitude relative to a previous point.

21. A vehicle navigation system as recited in claim 18, wherein said zoomed maneuver instruction view is a magnified view of said map display view.

22. A vehicle navigation system as recited in claim 18 wherein said CPU identifies a predetermined number of said shape points within said road segments to determine said complexity of said road segments.

23. A vehicle navigation system as recited in claim 18 wherein said CPU identifies a number of said shape points within a predetermined distance from the position of the vehicle to the first maneuver to determine said complexity.

24. A vehicle navigation system as recited in claim 23 wherein said predetermined distance includes a plurality of said road segments.

25. A vehicle navigation system as recited in claim 18, wherein said CPU adjusts said zoomed maneuver instruction view on said display to display said first maneuver and said vehicle icon.

26. A vehicle navigation system as recited in claim 18, wherein said CPU continually adjusts said zoomed maneuver instruction view on said display closer to said first maneuver in response to a position of the vehicle relative to said first maneuver.

27. A vehicle navigation system as recited in claim 26, wherein said CPU stops adjustment of said zoomed maneuver instruction view on said display when said first maneuver substantially fills said display.

28. A vehicle navigation system as recited in claim 27, wherein said CPU moves said vehicle icon along said first maneuver in response to a position of the vehicle relative to said first maneuver.

29. The vehicle navigation system of claim 18 further including,
   displaying a vehicle icon relative to said database of roads while displaying said zoomed maneuver instruction view of said first maneuver.

30. A method for navigating a vehicle including the steps of:
   (a) determining a route on a plurality of roads to a destination via a plurality of maneuvers, said route including a first maneuver;
   (b) determining a complexity of a road segment adjacent said first maneuver, by comparing a number of shape points in the road segment to a threshold; and
   (c) displaying a zoomed view of said maneuver in response to said complexity of said first maneuver determined in said step (b) if the number of shape points exceeds the threshold and if the first maneuver is an immediately upcoming maneuver.

31. The method of claim 30 wherein said step (c) includes magnifying a 2-dimensional map view.

32. The method of claim 30 wherein said step (b) is based upon a shape point quantity within a predetermined distance.

33. The method of claim 32 wherein said predetermined distance includes the road segment.

34. The method of claim 30 wherein said step (c) includes displaying a map display view until the vehicle is within a predetermined distance of said first maneuver.

35. The method of claim 30 wherein said step (c) includes displaying a map display view until a position of the vehicle represented by a vehicle icon and said first maneuver represented by a first maneuver instruction are located within a border.

36. The method of claim 35 wherein said step (c) includes magnifying said zoomed view to maintain said vehicle icon and said first maneuver instruction within said border.

37. The method of claim 30 wherein said step (c) includes magnifying said zoomed maneuver instruction view in response to a position of the vehicle relative to said first maneuver.

38. The method of claim 30 wherein said step (c) includes displaying a vehicle icon relative to said first maneuver while displaying said zoomed view of said first maneuver.

39. A method for navigating a vehicle including the steps of:
   (a) determining a route on a plurality of roads to a destination via a plurality of maneuvers, said route including a next maneuver;
   (b) determining the position of the vehicle relative to the plurality of roads;
   (c) displaying the plurality of roads and a vehicle icon at the position of the vehicle at a first level of magnification;
   (d) after said step (c), comparing a number of shape points within a predetermined distance of the position of the vehicle on the route to a threshold;
   (e) if the number of shape points exceeds the threshold, displaying the vehicle icon, said plurality of roads and said next maneuver at an increased level of magnification greater than the first level of magnification.

40. A method for navigating a vehicle including the steps of:
   (a) determining a route on a plurality of roads to a destination via a plurality of maneuvers, said route including a next maneuver;
   (b) determining the position of the vehicle relative to the plurality of roads;
   (c) displaying the plurality of roads and a vehicle icon at the position of the vehicle at a first level of magnification;
   (d) after said step (c), comparing a number of shape points in a road segment adjacent said next maneuver to a threshold;
   (e) if the number of shape points exceeds the threshold, displaying the vehicle icon, said plurality of roads and said next maneuver at an increased level of magnification greater than the first level of magnification.

* * * * *